United States Patent Office 3,096,336
Patented July 2, 1963

1

3,096,336
GLYCERYL MONONITRATE DINICOTINATE
Edgar A. Ferguson, Jr., Brooklyn, N.Y., assignor to Amfre-Grant, Inc., Brooklyn, N.Y.
No Drawing. Filed Jan. 22, 1962, Ser. No. 167,949
1 Claim. (Cl. 260—295.5)

The present invention relates to the new compound glyceryl mononitrate dinicotinate, and more particularly to glyceryl mononitrate dinicotinate which is an effective vasodilator.

Nitroglycerin is one of the most common and widely used vasodilators. This substance has an extremely rapid action, which however, is of short duration.

It is a primary object of the present invention to provide a new compound which acts as a vasodilator similarly to nitroglycerin but which is of longer duration of action.

It is another object of the present invention to provide a fast acting, relatively long duration vasodilator.

Other objects and advantages of the present invention will be apparent from a further reading of the specification and of the appended claim.

With the above and other objects in view, the present invention mainly comprises a new compound glyceryl mononitrate dinicotinate of the following structural formula:

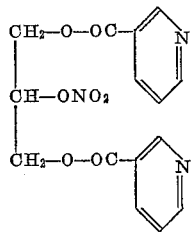

The compound of the present invention is produced by esterifying glyceryl mononitrate, which may be produced in known manner, with 2 mols of nicotinic acid. The glyceryl mononitrate contains the nitrate group of the middle carbon atom, and accordingly when glyceryl mononitrate is esterified with 2 mols of nicotinic acid the resulting glyceryl mononitrate dinicotinate contains the nicotinic acid radicals on the first and third carbon atoms. The esterification of the glyceryl mononitrate with the nicotinic acid may be carried out under normal esterification conditions.

The glyceryl mononitrate dinicotinate of the present invention acts rapidly as a vasodilator and retains its action over a relatively prolonged period of time.

The following examples are given to illustrate the production of glyceryl mononitrate dinicotinate in accordance with the present invention. The scope of the invention is not, however, mean to be limited to the specific details of the examples.

*Example I*

92.1 grams of glycerol are placed in a reaction flask attached to a reflux condenser. 63 grams of concentrated nitric acid (calculated as anhydrous) and 20 grams of anhydrous sulfuric acid are added thereto. The reaction flask is immersed in sand at a temperature of 140° C. The reaction is allowed to proceed for a period of 48 hours. At the end of this time the reaction flask is flushed out with 100 cc. of ethyl alcohol and placed in an open beaker. An additional 100 cc. of ethyl alcohol is added and bicarbonate of soda is added in portions until the mixture is neutral. After stirring, the solution of glyceryl mononitrate is decanted. The ethyl alcohol may be substantially removed by evaporation.

136 grams of the thus produced glyceryl mononitrate are placed in a reaction flask. 270 grams of nicotinic acid and 40 grams of sulfuric acid are added. Sufficient benzene (about 100 cc.) is added to make a thin slurry. With constant stirring the temperature is maintained constant at 120° C. for 48 hours. At the end of this time the reaction flask is flushed out with about 200 cc. of ethyl alcohol into a larger beaker. Sufficient bicarbonate is added to render the mixture neutral. The fluid is decanted from the residue after standing and glyceryl monodinicotinate is recovered by evaporation of the solvents. The glyceryl mononitrate dinicotinate melts at 164° C. (with decomposition).

The compound may be handled either by dilution 1:20 with beta lactose or in a 5% solution of ethyl alcohol. These are convenient forms for further admixture with any pharmaceutical vehicle.

*Example II*

Nicotinyl chloride was prepared by the method of Wingfield et al. J. Am. Chem. Soc. 75, 4364 (1953). To the filtered benzene solution of nicotinyl chloride (0.09 mole) was added dropwise with stirring 5.0 g. (0.045 mole) glyceryl α-chlorohydrin. The mixture was stirred at room temperature for one hour at which time a solid separated out and stirring became ineffective. The solid was removed by filtration and recrystallized from ethyl alcohol. Yield 12 g. (63%), M.P. 114–116° C. (uncorrected). Analysis: Cl⁻ 2.42% theor.; 2.35% found.

Six grams of the product from the above reaction were dissolved in acetone and dimethyl formamide (300 ml.). To this was added a solution of sodium iodide in acetone and the mixture heated at 55° C. for one-half hour. The precipitate formed was removed by filtration and the solution treated with silver nitrate in absolute alcohol to convert the "tri-iodide" to the "trinitrate." The precipitated silver iodide was removed by filtration, the solution concentrated, and the oily residue recrystallized from acetone-petroleum ether. Melting point of product was 164° C. (with decomposition).

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

Glyceryl mononitrate dinicotinate of the following formula:

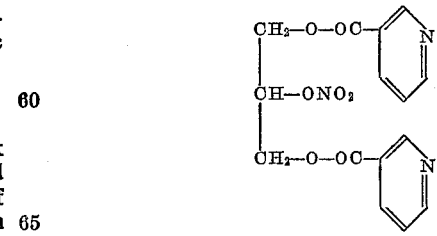

References Cited in the file of this patent

Badgett et al.: J.A.C.S., volume 69, page 2907 (1947).
Strong et al.: Arch. Biochem., volume 18, pages 297–303 (1948).
Charonnat et al.: Bul. Soc. Chim., France, 1948, pages 1014–17.